United States Patent
Yang

(10) Patent No.: US 6,510,999 B1
(45) Date of Patent: Jan. 28, 2003

(54) THERMOSTAT THREE-WAY CONTROL VALVE EQUIPPED WITH AUTOMATIC AIR VENT VALVE FOR AIR CONDITIONING FAN-COIL UNIT

(76) Inventor: Sam Tun-Sheng Yang, 10F-4, No. 634-9, Chin-Ping Rd., Chung-Ho City, Taipei Hsien (TW)

( * ) Notice: Subject to any disclaimer, the term of this patent is extended or adjusted under 35 U.S.C. 154(b) by 0 days.

(21) Appl. No.: 10/006,233

(22) Filed: Dec. 10, 2001

(51) Int. Cl.7 .............................................. F28F 27/00
(52) U.S. Cl. ...................... 236/36; 137/202; 137/625.29
(58) Field of Search .................. 236/34.5, 36; 237/8 C; 137/202, 625.29, 599.14

(56) References Cited

U.S. PATENT DOCUMENTS

| | | | | |
|---|---|---|---|---|
| 1,139,130 A | * | 5/1915 | McKeown | 137/202 |
| 3,973,729 A | * | 8/1976 | Sliger | 137/533.11 |
| 4,022,377 A | * | 5/1977 | Wagner et al. | 236/34.5 |
| 4,052,965 A | * | 10/1977 | Morris | 123/41.05 |
| 4,193,542 A | * | 3/1980 | Knauss | 236/34.5 |
| 4,300,718 A | * | 11/1981 | Beyer | 123/41.09 |
| 4,358,051 A | * | 11/1982 | Hunt | 123/41.1 |
| 4,428,527 A | * | 1/1984 | Daigler | 137/519.5 |
| 5,450,881 A | * | 9/1995 | Patterson | 137/202 |

* cited by examiner

Primary Examiner—William E. Tapolcai
(74) Attorney, Agent, or Firm—Bacon & Thomas, PLLC

(57) ABSTRACT

A thermostat three-way control valve equipped with an automatic air vent valve for air conditioning fan-coil unit includes a thermostat three-way control valve located between a chilled water supply branch pipe and a chilled water return pipe of a fan-coil unit, and an automatic air vent valve located above the thermostat three-way control valve. The thermostat three-way control valve includes a driving motor which is located at one side of the thermostat three way control valve. The thermostat three-way control valve may be a three-way valve or a two-way valve. The automatic air vent valve can automatically vent air from the fan-coil unit such that no residual air is trapped in the cooling coil of the fan-coil unit thereby to maintain heat exchange efficiency of the fan-coil unit.

3 Claims, 6 Drawing Sheets

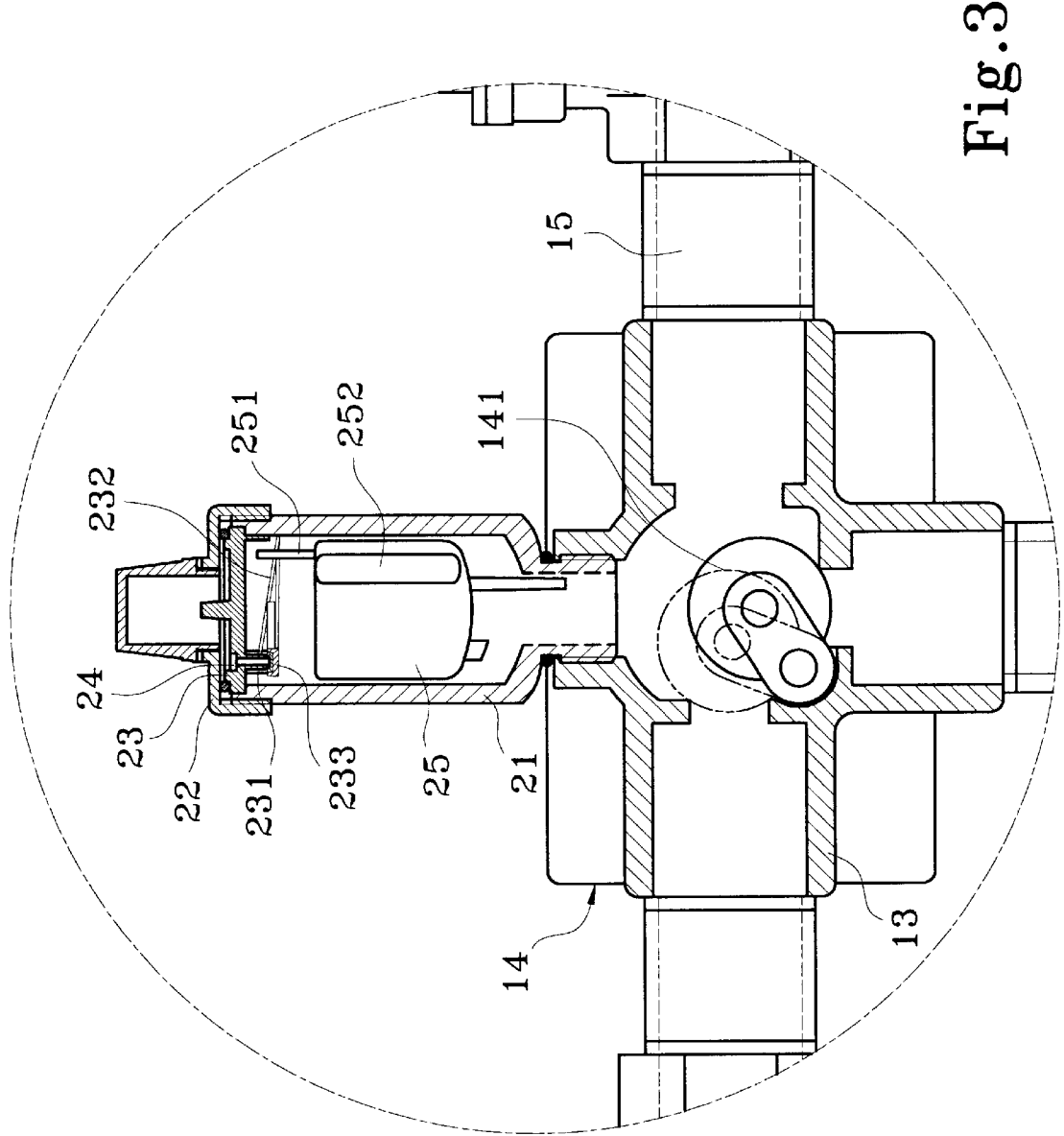

US 6,510,999 B1

THERMOSTAT THREE-WAY CONTROL VALVE EQUIPPED WITH AUTOMATIC AIR VENT VALVE FOR AIR CONDITIONING FAN-COIL UNIT

FIELD OF THE INVENTION

The present invention relates to a fan-coil three way control equipped with an automatic air vent for air conditioning automatically removing all pockets of air as they can be accumulated in the cooling coil of the fan-coil unit and to keep heat exchange efficiency.

BACKGROUND OF THE INVENTION

Most business and commercial buildings nowadays have a closed interior space. Air conditioning becomes very important to those buildings.

FIG. 1 illustrates a conventional fan-coil unit A that is generally being installed under the slab of the building. It has a chilled water supply branch pipe A1 and a chilled water return pipe A2 connecting from main chilled water supply pipe A3 and main chilled water return pipe A4 that located beneath the beam. And there is a manual air vent valve B in the fan-coil unit A to vent the air.

As the space around the fan-coil unit A is relatively small, venting the manual air vent valve B may be not so difficult during the period of installation because of no much obstacles have been built yet, but it is not so easy or convenient once installation and interior decoration are completed. To venting the manual air vent valve become a tedious job after installation. Maintenance people usually have to crawl into the manholes to unfasten the manual air vent valve B to vent residual air trapped in the cooling coil of the fan-coil unit A. Otherwise air will be accumulated in the cooling coil and result in decreasing of heat exchange efficiency of the fan-coil unit and reducing air conditioning effect.

A large building usually has many fan-coil units to meet air conditioning requirements in the big closed environment. It takes a great amount of maintenance labors and time to vent exhaust air from the fan-coil units. It is a big cost item.

Moreover, fan-coil control valves now available on the market are generally grouped as diverting type and mixing type. The diverting type design includes a complicated piping arrangement. Hence, the mixing type design may be preferable.

SUMMARY OF THE INVENTION

In view of the foregoing disadvantages, the primary object of the invention is to provide an improved fan-coil control valve that has an automatic air vent valve coupled with a mixing type three-way or two-way control valve to vent air more conveniently for fan-coil units.

The invention mainly includes an automatic air vent valve installed on a three-way control valve located between a chilled water supply branch pipe and a chilled water return branch pipe to generate automatic air vent effect, thereby to remove all pockets of residual air as they can be accumulated in the cooling coil of the fan-coil unit to maintain high efficiency of heat exchange.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3 is a sectional view of the invention.

DESCRIPTION OF THE PREFERRED EMBODIMENTS

Figure 1:
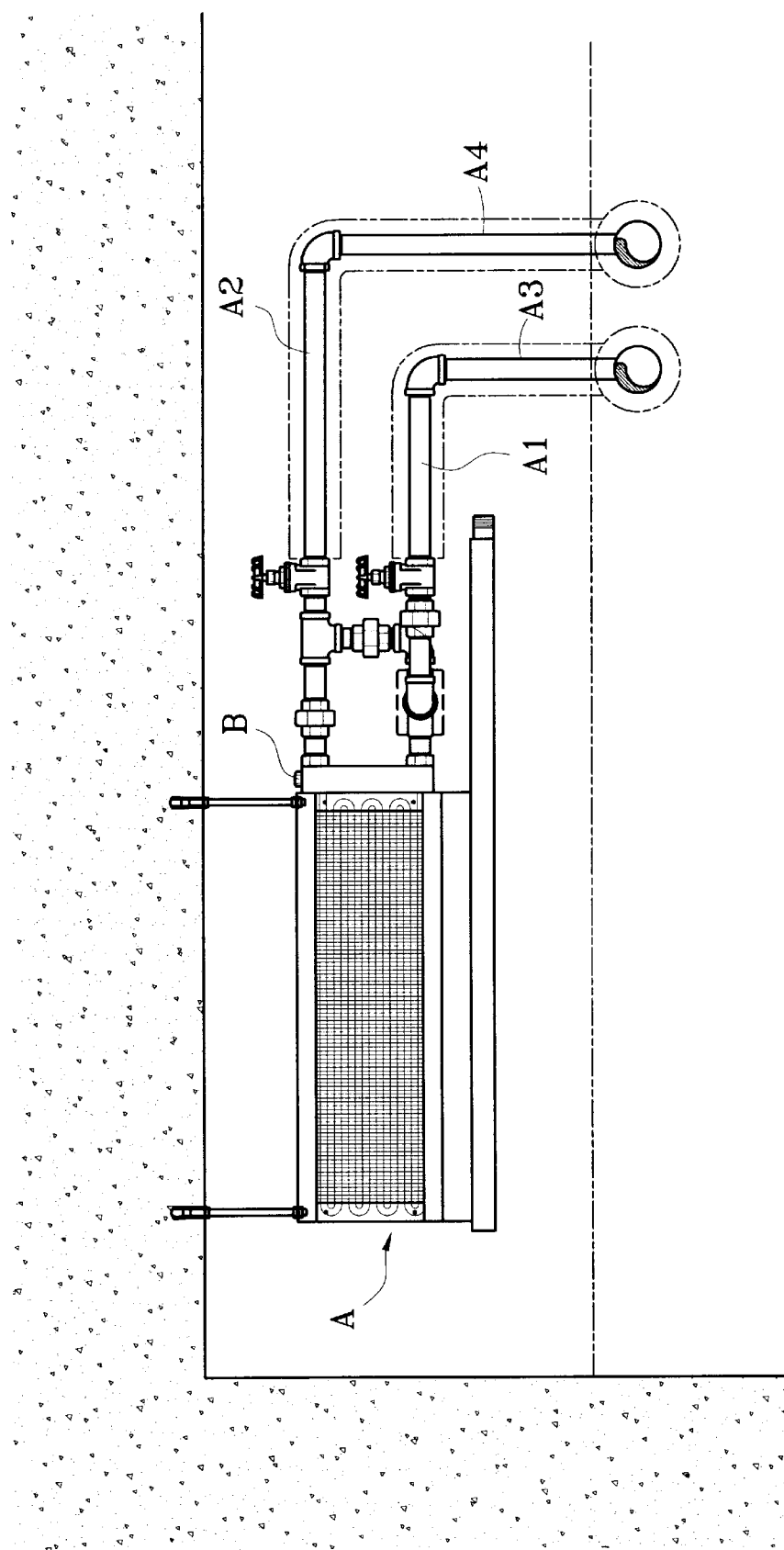
FIG. 1 is a schematic view of a conventional fan-coil piping arrangement.
Figure 2:
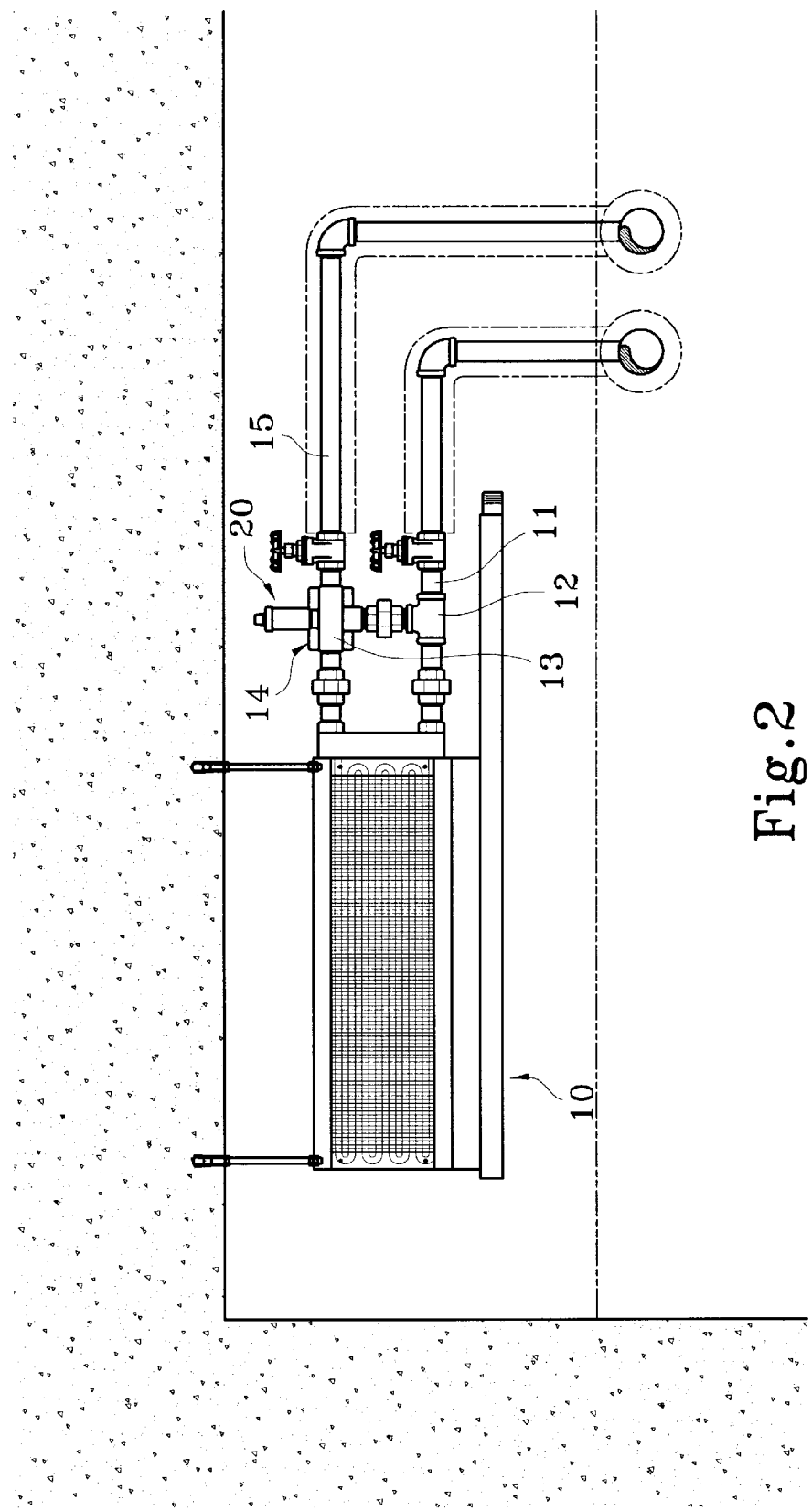
FIG. 2 is a schematic view of an embodiment of the invention.
Figure 5:
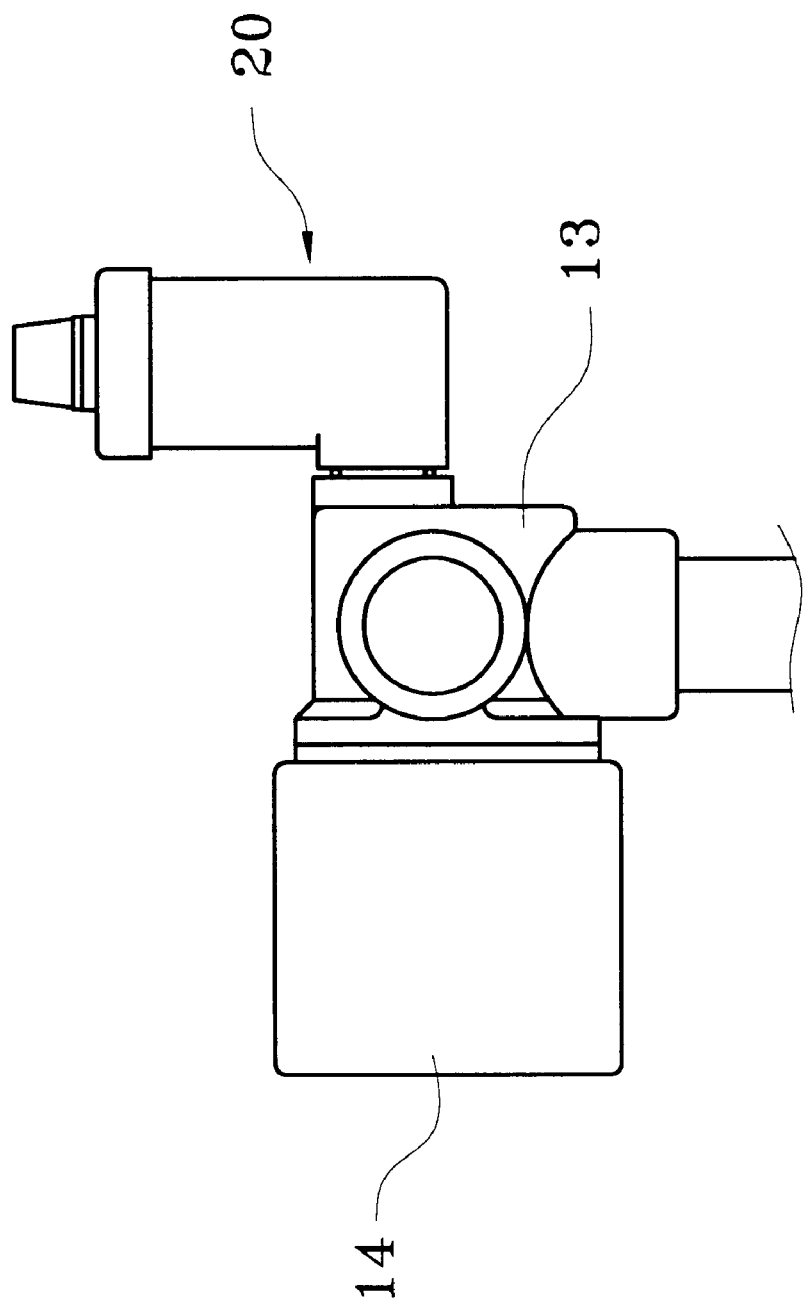
FIG. 5 is a schematic side view of another embodiment of the invention.

Referring to FIGS. 2, 3 and 5 for embodiments of the invention, the invention mainly includes a thermostat three-way control valve 13 located between a chilled water supply branch pipe 11 and a chilled water return branch pipe 15 of a fan-coil unit 10. Below the fan-coil unit 10, there is a water drain pan 12 for holding condensate water. There is an automatic air vent valve 20 connecting to the thermostat three-way control valve 13 on the chilled water return branch duct 15. The thermostat three-way control valve 13 includes a driving motor 14 for controlling water flow direction. The driving motor 14 is located on one side of the thermostat three-way control valve 13.

The automatic air vent valve 20 consists of a casing 21 and a cap 22 and a seal washer 23 sandwiched between the casing 21 and the cap 22. There is also an exhaust hole 24 located between the casing 21 and the cap 22. Below the seal washer 23, there is a pivotal fastening section 231 which is pivotally engaged with a linkage bar 232. The linkage bar 232 has another end pivotally engaged with a moving plug 233. There is further a float element 25 which has a coupling section 251 engaged with the moving plug 233. There are a plurality of air channels 252 formed on the periphery of the float element 25.

The driving motor 14 may be activated by a temperature value preset in a temperature controller (not shown in the drawings) located in the air conditioning space to turn a transfer member 141 for controlling water flow direction.

Figure 4A:
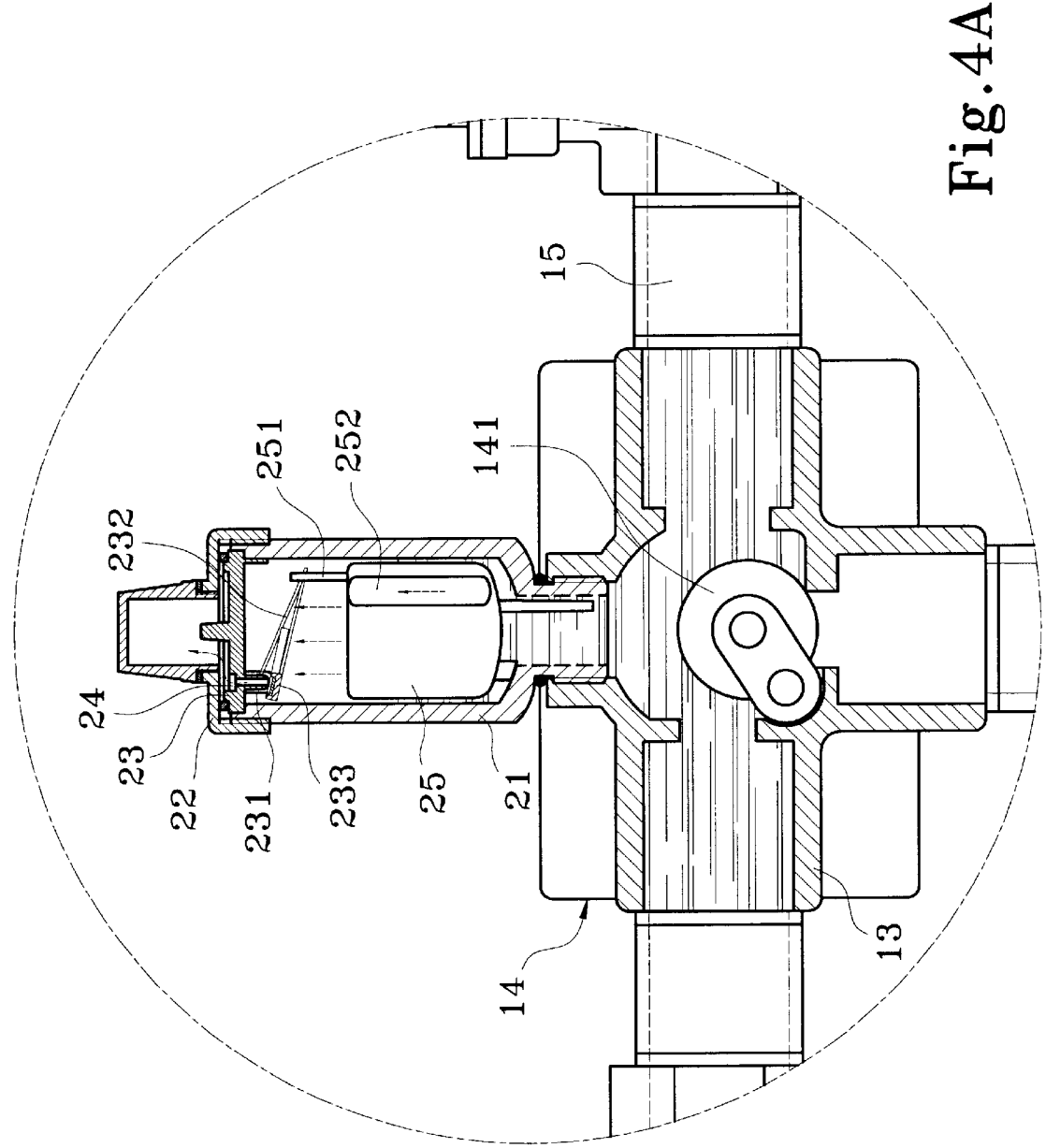
FIG. 4A is a sectional view of the invention, when the air venting valve is opened.
Figure 4B:
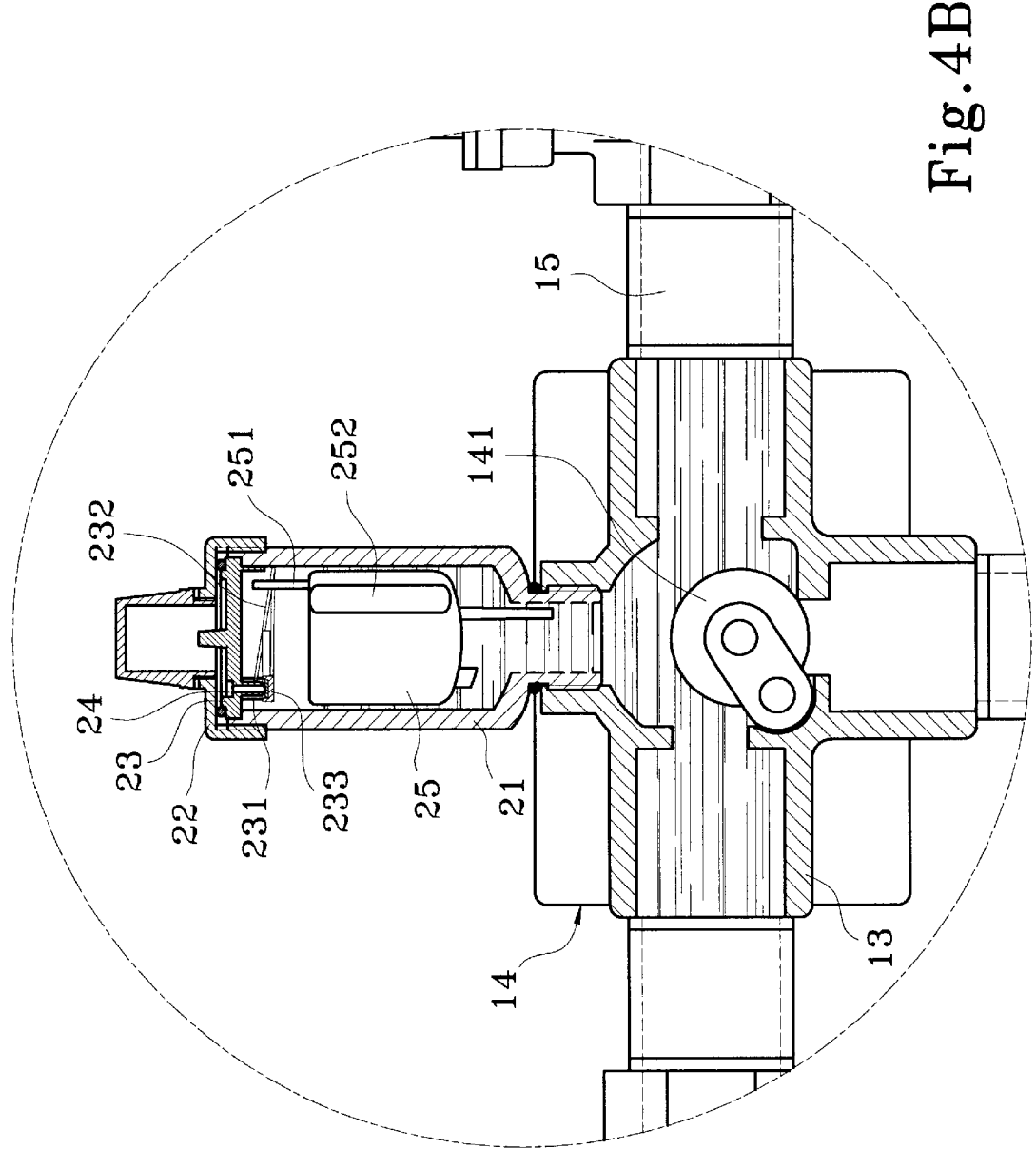
FIG. 4B is another sectional view of the invention, when the air venting valve is closed.

Referring to FIGS. 4A and 4B, when the invention is in use, the fan-coil unit 10 generates air during operation in the cooling water pipe (not shown in the drawings). The air will move upwards because of physical principle and gradually fill in the automatic air vent valve 20. When the air accumulated in the automatic air vent valve 20 reaches a certain amount, water level in the automatic air vent valve 20 will be depressed downwards. When the water level is lower than the float element 25, the float element 25 will drop downwards and moves the linkage bar 232 and moving plug 233 downwards. As a result, the exhaust hole 24 between the casing 21 and the cap 22 will be opened and forms a passage. When the water level in the automatic air vent valve 20 raises again because of water pressure, air trapped in the automatic air vent valve 20 will be discharged through the exhaust hole 24. Once the water level raises and becomes higher than the float element 25, the exhaust hole 25 will be closed again by the moving plug 233. Thereby an automatic air vent effect will be generated. As a result, the cooling coil of the fan-coil unit will be freed from residual air and heat exchange efficiency of the fan-coil unit will be maintained without adverse impact.

What is claimed is:

1. A thermostat three-way control valve equipped with an automatic air vent valve for air conditioning fan-coil unit, comprising:

a thermostat three-way control valve located between a chilled supply water branch pipe and a chilled water return pipe of a fan-coil unit such that chilled water can flow through the chilled water supply branch pipe, into the fan-coil unit and exit the fan-coil unit via the chilled water return branch pipe; and an automatic air vent valve located above the thermostat three-way control valve automatically vents air accumulated in the fan-coil unit such that no residual air is trapped in the cooling coil of the fan-coil unit in order to maintain heat exchange efficiency of the fan-coil unit.

2. The thermostat three-way control valve equipped with an automatic air vent valve of claim 1, wherein the thermostat three-way control valve includes a driving motor located at one side of the thermostat three-way control valve adapted to be activated by a temperature controller to control the direction of water flowing into the fan-coil unit.

3. The thermostat three-way control valve equipped with an automatic air vent valve of claim 1, wherein the automatic air vent valve is located at one side of the thermostat three-way control valve and adapted to fit to buildings of low ceiling height.

* * * * *